Sept. 20, 1971     D. W. BARTON ET AL     3,606,434
RESILIENT BUMPER ASSEMBLY FOR A MOTOR VEHICLE
Filed Aug. 27, 1969     3 Sheets-Sheet 1
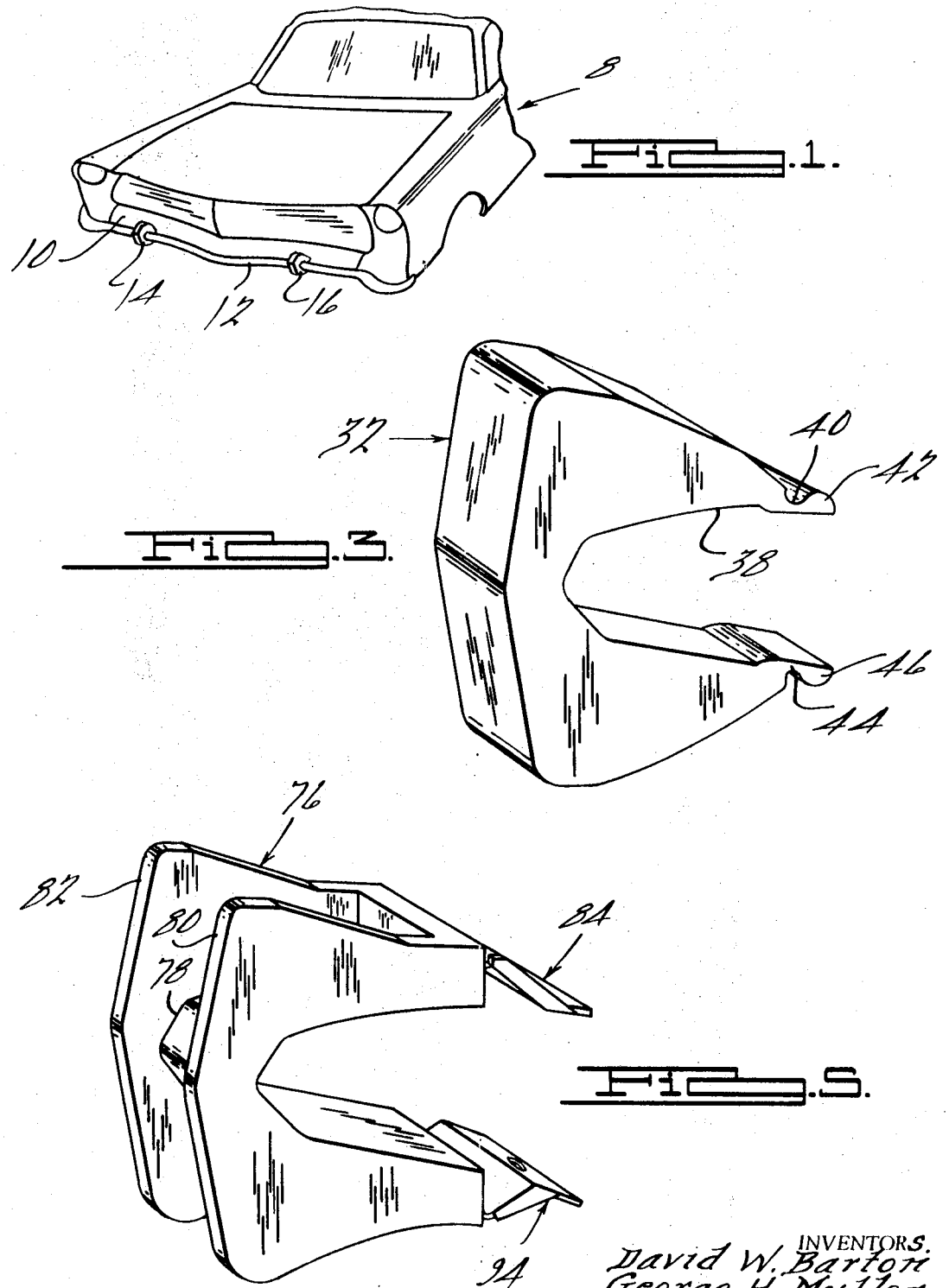
INVENTORS.
David W. Barton
George H. Muller
BY John R. Faulkner
E. Dennis O'Connor
ATTORNEYS.

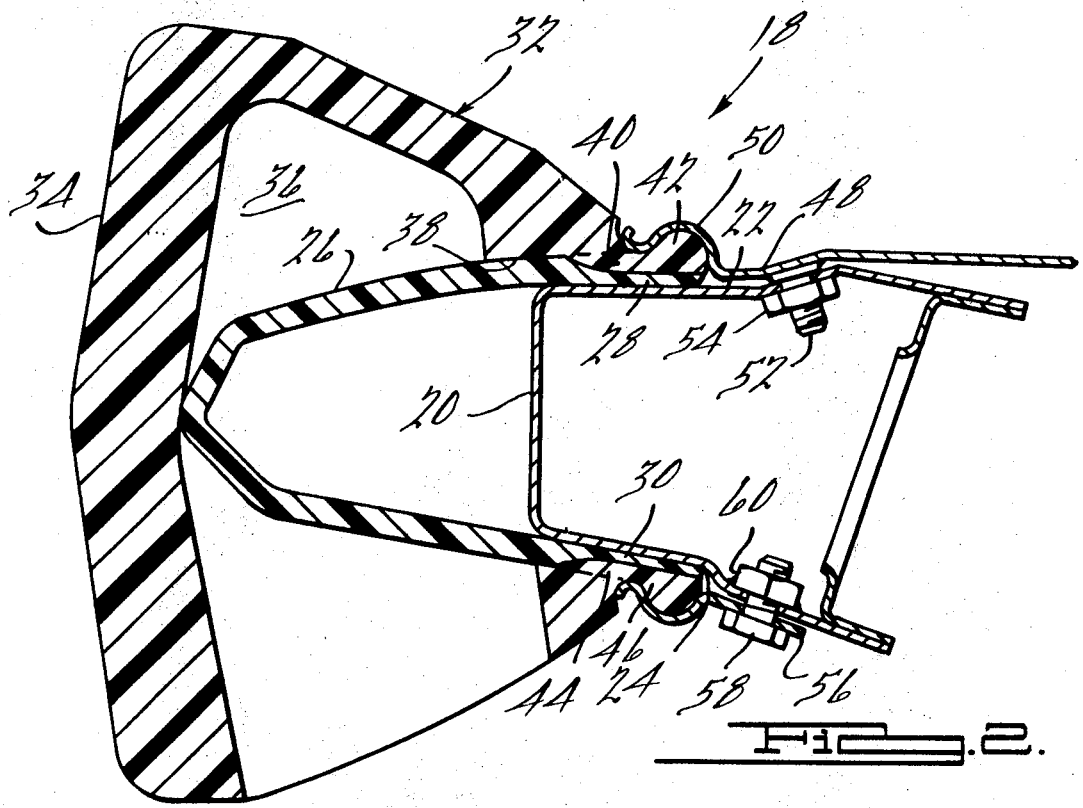
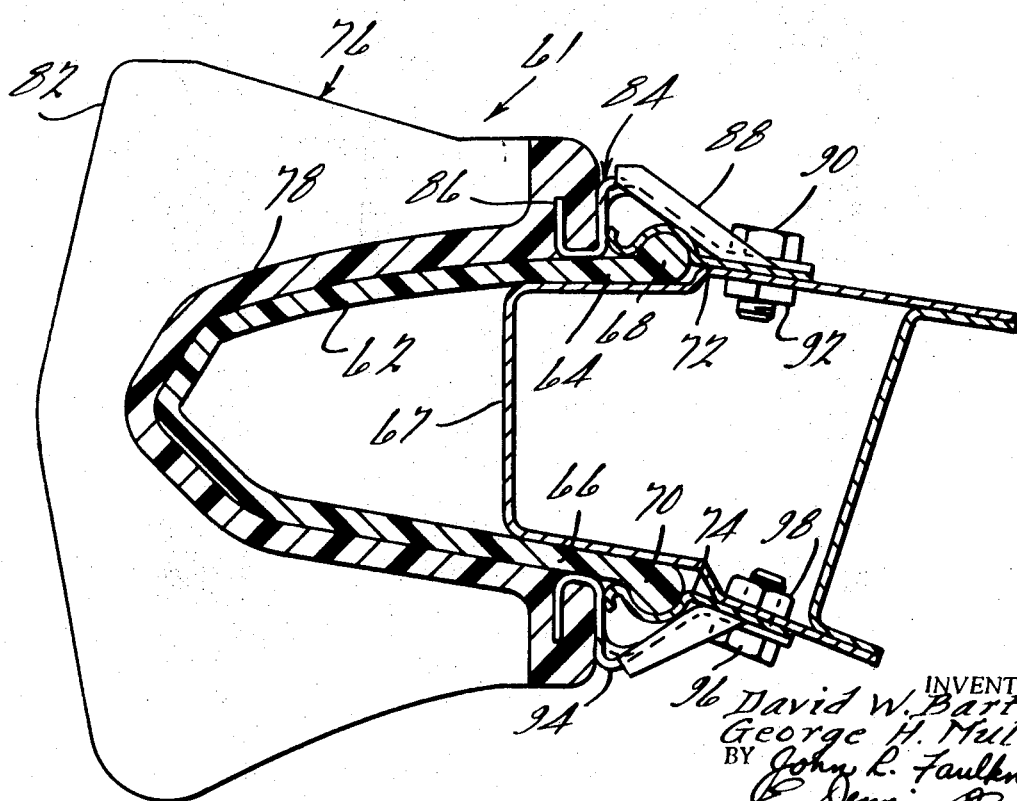

Sept. 20, 1971         D. W. BARTON ET AL         3,606,434
              RESILIENT BUMPER ASSEMBLY FOR A MOTOR VEHICLE
Filed Aug. 27, 1969                                    3 Sheets-Sheet 3

INVENTORS
David W. Barton
George H. Mutter
BY John R. Faulkner
E. Dennis Connor
ATTORNEYS.

United States Patent Office 3,606,434
Patented Sept. 20, 1971

3,606,434
RESILIENT BUMPER ASSEMBLY FOR A MOTOR VEHICLE
David W. Barton, Birmingham, and George H. Muller, Ann Arbor, Mich., assignors to Ford Motor Company, Dearborn, Mich.
Filed Aug. 27, 1969, Ser. No. 853,350
Int. Cl. B60r 19/08
U.S. Cl. 293—64                              9 Claims

ABSTRACT OF THE DISCLOSURE

A resilient bumper assembly for a motor vehicle. This assembly includes a resiliently deformable bumper and at least one resiliently deformable bumper guard having a vertical dimension greater than the vertical dimension of the bumper. The bumper and bumper guard are secured to a vehicle structural member and to each other by one of a plurality of clamp arrangements. These clamps function without the necessity of fasteners extending through holes in the resilient members, but rather engage enlarged beads formed on the resilient members or the clamps are molded partially within these members.

BACKGROUND OF THE INVENTION

Since the early days of motor vehicle development, it has been recognized that the inclusion on a vehicle of a flexible or resiliently deformable bumper potentially can reduce or eliminate minor vehicle damage caused during low speed collisions. It is believed that the absence of widespread commercial utilizations of resiliently deformable bumpers may be attributed to the difficulties inherent in the design and production of such bumpers capable of realizing the potential advantages described above. These difficulties include but are not limited to the previous lack of (1) an available resilient material capable of functioning reliably over the life of a motor vehicle and (2) a bumper design that maximizes energy absorption capabilities while taking advantage of economically feasible production techniques.

Recently, technical innovations have been made that have enabled the design of commercially acceptable resiliently deformable bumpers to be accomplished. Examples of such bumpers may be found disclosed by our copending United States patent applications Ser. No. 836,776 filed June 26, 1969, and Ser. No. 836,895 filed June 26, 1969, both of which are assigned to the assignee of this invention.

As with conventional metal bumpers, the maximum damage ameliorating capabilities of resiliently deformable bumpers are limited by the fact that during multiple vehicle crashes, the bumpers of the colliding vehicles often do not meet. This is due to such factors as variances in the distances of the bumpers of various makes and styles of vehicles from the road surfaces, irregularity in road surfaces and the tendency of vehicle body structure, including bumpers, to rise and fall during periods of change in vehicle velocity.

To counteract these factors, conventional bumper assemblies have included oversize bumper guards or bumperattes having vertical dimensions greater than the bumpers with which these bumper guards cooperate. The inclusion of resiliently deformable bumper guards in a bumper assembly having a resilient main bumper presents special problems, however, since it is undesirable to locate fastener means through holes in resiliently deformable material that will be subjected to impact forces. Also, the mounting arrangement utilized in such a bumper assembly must be simple and uncomplicated to the extent that it is adaptable to the high volume production methods used in the assembly of mass produced motor vehicles.

It is an object of this invention to provide a bumper assembly for a motor vehicle including a resiliently deformable main bumper and a resiliently deformable bumper guard. The bumper and bumper guard operatively are secured to a vehicle structural member and to each other by a mounting scheme that does not require fastener elements to be passed through holes in the material from which the resiliently deformable elements are formed. Also, this mounting scheme is simple and uncomplicated and the manual tasks necessary at the time of assembly of this bumper arrangement may be accomplished easily under automotive assembly line conditions.

SUMMARY OF THE INVENTION

A resilient bumper assembly constructed in accordance with this invention is adapted for inclusion on a motor vehicle having a structural member located proximate one of its ends. The bumper assembly comprises an elongate bumper extending substantially horizontally and being adjacent the structural member. The bumper is constructed of resiliently deformable material and projects in a substantially convex profile away from the structural member. A bumper guard formed from resiliently deformable material and having a vertical dimension exceeding the vertical dimension of the bumper is formed with a main body having an opening extending thereinto. The bumper is received in the opening in the bumper guard body in a snug fit. Mounting means secure both the bumper and the bumper guard to the structural member and prevent movement of the bumper guard relative to the bumper in the event the former is subjected to impact forces. These mounting means include a plurality of clamp elements that are secured to the structural member by a common fastener arrangement.

DESCRIPTION OF THE DRAWINGS

FIG. 1 is an isometric view of a portion of a motor vehicle including a resilient bumper assembly constructed in accordance with this invention;

FIG. 2 is a side elevation view, taken in section, of a first embodiment of a resilient bumper assembly according to this invention;

FIG. 3 is an isometric view of the bumper guard portion of the assembly of FIG. 2;

FIG. 4 is a view similar to FIG. 2 but showing a second embodiment of bumper assembly;

FIG. 5 is an isometric view of the bumper guard utilized in the assembly of FIG. 4.

DETAILED DESCRIPTION OF THE INVENTION

Figure 6:
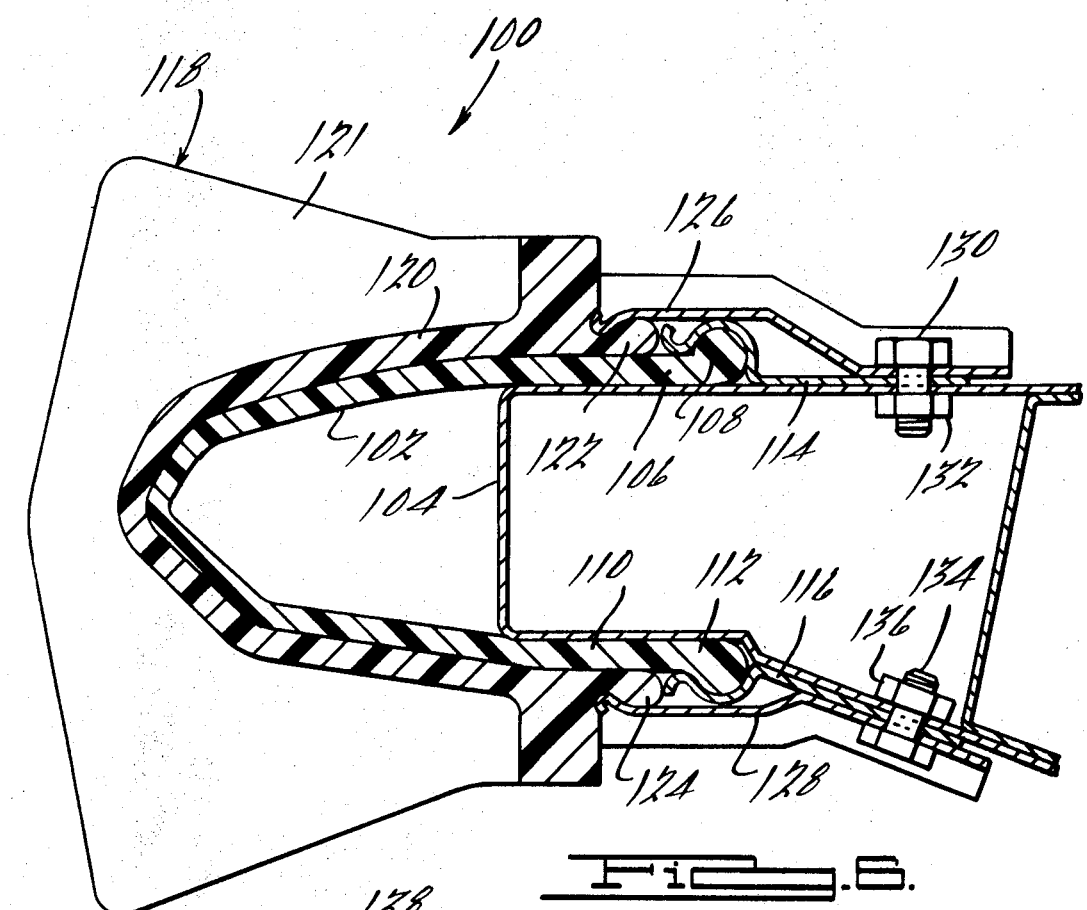
FIG. 6 is a view similar to FIG. 4 but showing a third embodiment of bumper assembly.

Referring now in detail to the drawings, and in particular to FIG. 1 thereof, the numeral 8 denotes generally a motor vehicle having included thereon a resilient bumper assembly constructed in accordance with this invention. Vehicle 8 includes a front structural member 10 to which is attached a bumper 12 that is oriented in a substantially horizontal position across the front of the vehicle. It is to be understood that this bumper could be positioned in a like manner across the rear of the vehicle. The bumper 12 is connected to the front structural member 10 in the manner to be discussed in greater detail below. Bumper guards 14 and 16 are connected to both the bumper 12 and the front structural member 10 by mounting means to be disclosed in detail below, and have a vertical dimension greater than the vertical dimension of the bumper 12. Because of this dimensional characteristic, bumper guards 14 and 16 increase the effective area of bumper 12 and provide for energy absorption and a minimization of impact damage to the front of vehicle 8 in the event of a collision between this vehicle and another vehicle whose bumper is not positioned at the same height as bumper 12 at the time of collision.

FIGS. 2 and 3 illustrate a first embodiment 18 of resilient bumper assembly constructed in accordance with this invention. Assembly 18 is adapted for mounting on a structural member 20 of a vehicle. This structural member 20 may be part of the vehicle frame or be a suitable vehicle body member extending across one extremity of the vehicle. As may be seen from FIG. 2, member 20 has a box shape and has a top surface 22 and a bottom surface 24. A bumper 26, having a convex profile, is arranged proximate structural member 20 and projects forwardly from the structural member. A top portion 28 of bumper 26, having a reduced cross section, overlies top surface 22 of structural member 20. A bottom portion 30 of bumper 26, similar in cross section to portion 28, overlies bottom surface 24.

A bumper guard, denoted generally by the reference numeral 32, includes a main body portion 34 defining a hollow cavity 36. Main body 34 is bifurcated into top and bottom portions. The space between the two portions of the main body 34 is designated by the reference numeral 38. The top portion 40 of the main body 34 has a bottom surface that corresponds in profile to top portion 28 of bumper 26. An enlarged bead 42 integrally is formed on the extremity of top portion 40 of main body 34. The bottom portion 44 of main body 34 has a similar enlarged bead 46 formed thereon and also corresponds in profile to the bottom portion 30 of bumper 26. It thus may be seen that bumper 26 extends into cavity 36 and that the contact between that portion of the bumper 26 and main body 34 is a snug fit.

A top clamp 48 having a curved portion 50 engages bead 42 of main body 34. Secured to clamp 48 as by welding is a stud 52 that extends through a hole formed in structural member 20. A nut 54 engages the threads of stud 52 to secure clamp 48 to the structural member. It readily may be appreciated that by tightening nut 54 on stud 52, top portion 40 of the bumper guard 32 is forced down upon portion 28 of bumper 26 such that the bumper, the bumper guard and the structural member are secured together and relative movement of these parts is prohibited. Since stud 52 is secured to the bottom surface of clamp 48, no part of the fastener arrangement that secures the clamp to member 20 is visible.

A similar clamp 56 engages bead 46 and is secured to the bottom of structural member 20 by nut 60 and bolt 58.

It readily may be appreciated that this clamping arrangement positively locates bumper guard 32 along the length of bumper 26 and prohibits relative movement of these parts to one another and structural member 20. Upon bumper 26 being impacted, the absorption of impact forces is provided by the deformation of resilient material from which the bumper and bumper guard are constructed. In the event a vertical misalignment occurs between the bumper 26 and the impacting structure, the impacting structure will contact the bumper guard 32 that will transmit the impact forces to the bumper 26 as well as absorbing energy itself.

It is to be understood that any number of bumper guards, such as that designated by the numeral 32, may be positioned along the horizontal length of bumper 26. Two such bumper guards have been found to be satisfactory.

A second embodiment of resilient bumper assembly constructed in accordance with this invention is illustrated in FIGS. 4 and 5 and designated generally by the numeral 61. This embodiment of the invention includes a resiliently deformable bumper 62 having a top portion 64 and a bottom portion 66 overlying the top and bottom portions respectively of a structural member 67. Top bumper portion 62 has formed on its extremity a large bead 68 and a similar bead 70 is formed at the extremity of the bottom portion 66. A top clamp member 72 engages bead 68 while a bottom clamp 74 engages bead 70. Clamps 72 and 74 are secured to structural member 67 in a manner to be described below such that they positively locate and secure bumper 62 relative to the structural member 67.

A bumper guard 76 is provided and has a main body 78 from which extend fin like elements 80 and 82. The main body 78 is formed with a recess into which extends the convex profile of resilient bumper 62. Mounting of bumper guard 76 relative to bumper 62 and structural member 67 is accomplished by clamps that are integrally secured to the main body 78 when the latter is formed, as by molding. A top clamp 84 has a first portion 86 molded within main body 78. A second portion 88 extends from the main body 78 and is secured to structural member 67 by means of a bolt 90 and nut 92. It should be noted that bolt 90 and nut 92 also secure clamp 72 to structural member 67 so that during the assembly of a motor vehicle including this arrangement, only a single fastener need be connected to secure both clamps 72 and 84 into place as shown in FIG. 4 of the drawings. A bottom clamp 94 is similarly connected to main body 78 and is secured to structural member 67, as is clamp 74, by common fasteners 98 and 96 comprising a nut and bolt respectively.

The embodiment of the invention shown in FIGS. 4 and 5, like the embodiment of the invention shown in FIGS. 2 and 3, provides for the mounting of a resiliently deformable bumper and a resiliently deformable bumper guard without the necessity of extending fasteners through holes formed in the resiliently deformable material. If fasteners were located through resiliently deformable material that is subjected to impact forces, the holes in the resiliently deformable material and the presence of the fasteners extending through these holes would weaken this material and possibly lead to tearing or other deteriorations during the impacting thereof.

FIG. 6 of the drawings shows a third embodiment of resilient bumper assembly constructed in accordance with this invention and designated generally by the numeral 10. In this embodiment of the invention, a resiliently deformable bumper 102 is located proximate a structural member 104 and includes a top portion 106 having a bead 108 formed thereon and a bottom portion 110 having a bead 112 formed thereon. Portion 106 and 110 overlie the top and bottom surfaces respectively of the structural member 104. A top clamp 114 engages bead 108 and a bottom clamp 116 engages bead 112.

A bumper guard 118, generally similar in shape to bumper guard 76 of FIG. 4, includes a main body 120 and fins 121 (one shown). Main body 120 overlies only a part of the portions 106 and 110 of bumper 102. Extending from main body 120 at the top thereof is a bead 122 and a corresponding bead 124 extends from the bottom main body 120. These beads are engaged by clamps 126 and 128 respectively that extend over the beads formed on the bumper 102. A bolt 130 and a cooperating nut 132 connect both top clamps 114 and 126 to structural member 112. A bolt 134 and a cooperating nut 136 secure both clamps 116 and 128 to the bottom of structural member 104.

Figure 7:
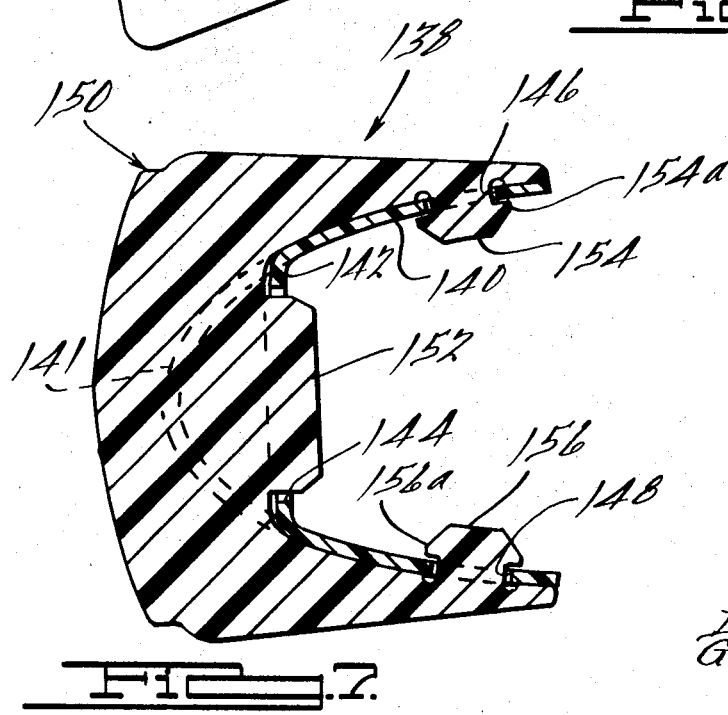
FIG. 7 is a side elevation view, taken in section, of a alternate manner of attaching a resilient bumper guard to a resilient bumper.

FIG. 7 denotes generally an arrangement 138 by which a bumper guard may be located along the length of a resiliently deformable bumper 140. The bumper 140 has a convex profile 141 but a certain portion of this profile forms a flat outer bumper surface as at 142. Flat portion 142 has a locating hole 144 formed therethrough and holes 146 and 148 are formed in the top and bottom surfaces respectively of the bumper.

A resiliently deformable bumper guard 150 has a concave inner surface from which projects a locating extension 152 adapted to be received in locating hole 144. Also extending from the interior profile of the bumper guard 150 are a downwardly directed snap projection 154 and an upwardly directed snap projection 156 adapted to be received in holes 146 and 148 respectively. Snap projection 154 is formed with a resiliently deformable shoulder 154a having a dimension greater than the opening 146, but that may be forced through the hole 146 in a snap action manner by manually deforming the material of the shoulder. Projection 156 has a similar shoulder 156a formed thereon, allowing its snap action insertion in opening 148.

The arrangement illustrated in FIG. 7 may be utilized to positively locate bumper guard 150 along the length of bumper 140 during final assembly of the vehicle. Bumper 140 and bumper guard 150 may be secured to one another and to a structural member of the motor vehicle carrying these members by any of the schemes shown in the embodiments of the invention described above. In the alternative, only bumper 140 may be positively secured to a vehicle structure member, as by one of the arrangements shown in FIGS. 4 or 6 of the drawings.

It thus may be seen that this invention provides a resilient bumper assembly adapted for use on a motor vehicle and whereby a resiliently deformable bumper and a resiliently deformable bumper guard may be mounted to vehicle structure so that relative movement between these parts is precluded. Furthermore, the mounting of these resiliently deformable members does not include the provision of holes formed in the members through which fasteners are inserted, but rather is accomplished by positive clamping arrangements bearing on the outside surfaces of these resiliently deformable members. Also, these clamping arrangements easily and conveniently may be utilized to take advantage of high speed mass production assembly methods utilized in the construction of a motor vehicle.

We claim:

1. A resilient bumper assembly for a motor vehicle including a structural member located proximate one end thereof and having a top surface and a bottom surface, said assembly comprising: an elongate resiliently deformable bumper extending substantially horizontally, portions of said bumper overlying both the top and bottom surfaces of said structural member, a resiliently deformable bumper guard having a vertical dimension greater than the vertical dimension of said bumper, said bumper guard having a cavity formed therein receiving said bumper such that said bumper guard overlies at least parts of said portions of said bumper, and clamp means secured to said structural member, said clamp means bearing on said bumper guard and exerting forces urging at least a portion of said bumper guard, one of said portions of said bumper and one of said surfaces of said structural member into intimate engagement to secure said bumper, bumper guard and structural member against relative movement.

2. The resilient bumper assembly of claim 1, wherein said clamp means included a plurality of clamp elements, said clamp elements bearing on said bumper guard such that at least one of said clamp elements exerts forces acting on each of said bumper portions, whereby said bumper guard and bumpers are secured to said structural member along both the top and bottom surfaces of said structural member.

3. The resilient bumper assembly of claim 1, wherein at least one integrally formed bead is formed along the parts of said bumper guard that overlie said bumper portions, said clamp means being contoured to intimately contact said bead.

4. The resilient bumper assembly of claim 1, wherein said clamp means includes a first clamp element engaging one of said bumper portions and a second clamp element engaging said bumper guard adjacent said one bumper portion.

5. The resilient bumper assembly of claim 1, wherein said first and second clamp elements are secured to said structural member by common fastener means.

6. A resilient bumper assembly for a motor vehicle including a structural member located proximate one end thereof and having a top surface and a bottom surface, said assembly comprising: an elongate resiliently deformable bumper extending substantially horizontally with portions of said bumper overlying both the top and bottom surfaces of said structural member, a resiliently deformable bumper guard having a vertical dimension greater than the vertical dimension of said bumper, said bumper guard having a cavity formed therein receiving said bumper such that said bumper guard overlies at least parts of said portions of said bumper, clamp means secured to said structural member and engaging at least one of said portions of said bumper to secure said bumper to said structural member, and bumper guard attachment means, a first portion of said attachment means being molded within said bumper guard and a second portion of said attachment means extending from said bumper guard and being secured to said structural member.

7. The resilient bumper assembly of claim 6, wherein said clamp means and the second portion of said attachment means are secured to said structural member by common fastener means.

8. A resilient bumper assembly for a motor vehicle including a structural member located proximate one end thereof and having a top surface and a bottom surface, said assembly comprising: an elongate resiliently deformable bumper extending substantially horizontally with portions of said bumper overlying both the top and bottom surfaces of said structural member, a resiliently deformable bumper guard having a vertical dimension greater than the vertical dimension of said bumper, said bumper guard having a cavity formed therein receiving said bumper such that said bumper guard overlies a first part of each of said portions of said bumper, first clamp means secured to said structural member and bearing on a second part of each of said portions of said bumper to secure said bumper to said structural member, and second clamp means secured to said structural member and bearing on those portions of said bumper guard overlying said first part of said bumper portions and exerting forces holding said bumper guard, bumper and structural member against relative movement.

9. The resilient bumper assembly of claim 8, wherein said first and second clamp means are secured to said structural member by common fastener means.

References Cited

UNITED STATES PATENTS 2,731,289   1/1956   Corydon _____ 293—67

ARTHUR L. LA POINT, Primary Examiner

R. SAIFER, Assistant Examiner

U.S. Cl. X.R.

293—71, 99